W. J. BURROWS & H. B. LAWRENCE.
PHOTOGRAPHIC CAMERA.
APPLICATION FILED AUG. 31, 1918.
1,301,815.
Patented Apr. 29, 1919.
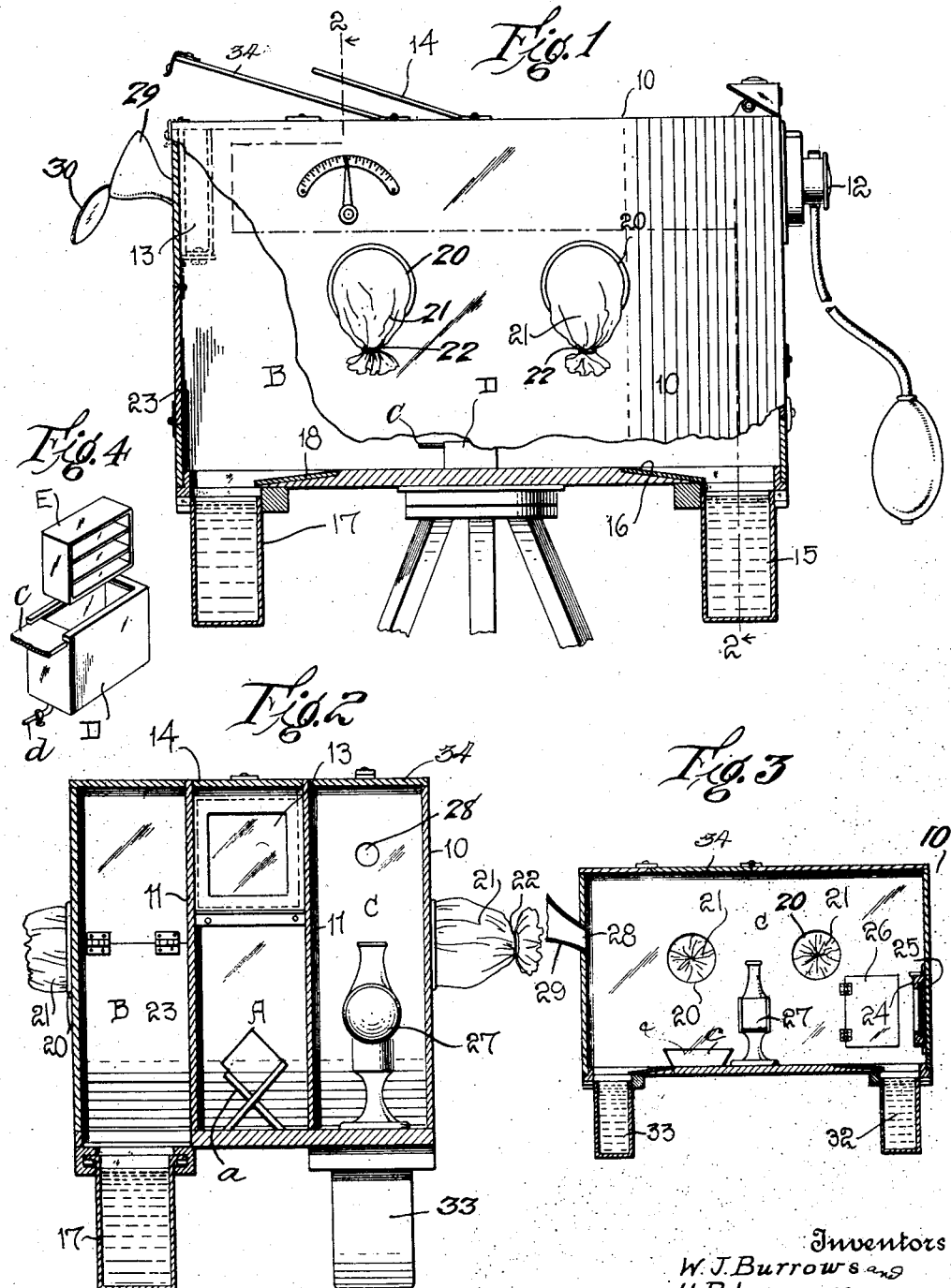

UNITED STATES PATENT OFFICE.

WILLIAM J. BURROWS AND HORACE B. LAWRENCE, OF VERNON, ALABAMA.

PHOTOGRAPHIC CAMERA.

1,301,815.        Specification of Letters Patent.      Patented Apr. 29, 1919.

Application filed August 31, 1918. Serial No. 252,223.

*To all whom it may concern:*

Be it known that we, WILLIAM J. BURROWS, and HORACE B. LAWRENCE, citizens of the United States, residing at Vernon, in the county of Lamar and State of Alabama, have invented certain new and useful Improvements in Photographic Cameras, of which the following is a specification, reference being had to the accompanying drawings.

This invention relates to photographic cameras, and the general object of the invention is to provide a camera wherein the plates after being exposed may be developed and printed, without removing the plate from the camera.

A further object is to provide a camera of the construction outlined above which is divided into three parts; the camera compartment within which the pictures are taken, a compartment in which the plates are developed, and a printing compartment, and in this connection to provide the walls of the outer compartments with sleeves, as they may be termed, into which the operator may put his arms with the hands extending through the ends of the sleeves into the interior of the camera so as to permit the proper manipulation of the plates in the process of developing and printing photographs.

A further object is to provide a device of this character in which the developing liquid, and the fixing liquid are carried in tanks attached to and opening into the developing and printing compartments.

Still another object is to provide the printing compartment with means whereby the negative and sensitized paper may be supported in the proper printing frame, and provide means whereby the degree of development of the printed photograph may be observed, without the necessity of removing the print from the interior of the camera during the process of the printing.

Other objects will appear in the course of the following description.

This invention is illustrated in the accompanying drawings, wherein:—

Figure 1 is a side elevation of a photographic camera constructed in accordance with this invention, the camera being partly broken away;

Fig. 2 is a section on the line 2—2 of Fig. 1;

Fig. 3 is a longitudinal sectional view through the compartment C; and

Fig. 4 is a perspective view of the washing box.

Referring to these drawings, it will be seen that the improved camera and developing and printing device comprises a rectangular outer casing 10. The casing 10 is divided into three sections A, B and C by means of longitudinally extending partitions 11. The compartment A constitutes the camera proper whereby the sensitized plate may be exposed and to this end, this compartment A at its forward end is provided with any suitable lens 12 and at its rear end is provided with a plate holder 13, and the compartment is provided in one wall with a door 14, whereby access may be had to the interior of the compartment.

Disposed beneath the forward end of the developing compartment B is a developing tank 15 which opens into this compartment and the bottom of the compartment is formed with a metallic drainage plate 16 so that liquid which may drip off the plate may drain back into the developing tank. This tank slides into place.

At the rear end of the compartment B there is provided a tank 17 containing a fixing solution. A drip pan or drainage plate 18 is also provided for this tank. A washing tank composed of sections B and E is likewise disposed in the compartment B.

The side walls of the compartments B and C are both provided with openings 20, to the margins of which are attached the somewhat conical sleeves 21 of flexible material, which is light proof. The small ends of these sleeves are open but provided with elastic bands 22 which cause the sleeves at their small ends to grip tightly around the wrist of the operator. These rubber bands 22 act to normally close these sleeves entirely so as to prevent the access of light to the interior of the camera box when the hands of the operator are withdrawn. Compartment B has a door 23 whereby the plates may be placed within the camera.

The front wall of the compartment C is provided with an opening having therein a printing frame 24 closed by a door 25 and beside this opening for the printing frame is a door 26, through which the prints may be removed. A lamp of any suitable character designated 27 is disposed within the printing compartment C, this lamp having a lens directing a beam of light toward the printing frame and preferably the rear end of the compartment B is provided with an observation opening 28 having therein a tube whose outer end is expanded to form an eye piece 29 having therein a pane of ruby glass 30 mounted so that it may be shifted over the eye piece 29 or shifted out of such position. Thus the operator may observe the process of developing the picture after printing. The printing compartment is also provided with tanks 32 and 33 to contain developing and fixing solutions for the print.

This compartment C is also provided with a door 34 in its top whereby access may be had to the interior of the compartment.

Of course, it is to be understood that the camera is to be provided with any suitable lens and with the usual shutter, finder, shutter actuating mechanism, and stops. I do not wish to be limited to the particular variety of camera, but I have illustrated a camera of the box type wherein the lens is always at a fixed distance from the plate, without the necessity of focussing.

In the operation of this camera, it is to be understood that the picture is taken in the usual manner, in the middle compartment A. After the picture is taken, the operator removes the exposed plate, and its plate holder, from the compartment A, through the door 14, and introduces it into the compartment B by a door 23 and there develops the plate in the tank 15, then washes it in the washing tank composed of the sections D and E, then immerses the plate in the fixing bath or tank 17. The dry plates are intended to be carried in plate holders of any ordinary or usual form disposed in racks a within the compartment A so that a fresh plate may be disposed in position for exposure after a plate has been exposed and removed. The washing tank, as above stated, is composed of two sections having compartments for a plurality of exposed plates, one of the sections being insertible into the other which is to be filled with water and then the tank which is now closed by the cover C can be gently shaken so that the water will have access to all surface of the plate so as to entirely wash the developer therefrom before the plate is disposed within the fixing bath. The section D has a drainage pipe d whereby the washing water may be drawn off.

After the plate has been fixed it may be removed from the camera and dried when it is ready for printing. The plate is to be disposed in the printing frame of the compartment C through the door 34. The manipulation of the paper within the compartment C is secured by the operator inserting his hands through the manipulating sleeves. This compartment is also provided with a developing tank, a fixing bath tank, and a receptacle c for containing water for washing the prints.

It is to be understood that the development of the plate and the fixing thereof, and the development and fixing of the prints is to be carried on in the usual and well-known manner, but it will be seen that I have provided in my camera not only a camera proper whereby the pictures are taken, but two dark rooms, one of which is used for developing and fixing the plate, while the other is used for developing and fixing the print, and that by this arrangement there is no necessity of removing the exposed plate from the camera in a dark room and developing this plate in a dark room, or in a tank, nor any necessity of printing in a dark room. The tanks for containing the developer and the fixing solutions are adapted to be removed from the body of the camera so they may be emptied and washed.

We claim:—

1. A camera of the character described comprising a casing divided into a photographing compartment, a plate developing and fixing compartment and a print developing, fixing and printing compartment, the first compartment being provided with means for supporting the photographic plate and with a lens, the second and third named compartments being provided with tanks adapted to contain developing and fixing solutions, the printing compartment having therein a lamp, the side walls of the casing being provided with sleeves through which the operator may insert his hands to thereby permit the manipulation of the plate and the printing paper.

2. A camera of the character described comprising a casing divided into a photographing compartment, a plate developing and fixing compartment and a print developing, fixing and printing compartment, the first compartment being provided with means for supporting the photographic plate and with a lens, the second and third named compartments being provided with tanks adapted to contain developing and fixing solutions, the printing compartment having therein a lamp, the side walls of the casing being provided with sleeves through which the operator may insert his hands to thereby permit the manipulation of the plate and the printing paper, the tanks for containing said solutions being removably engaged with the bottom walls of the said compartments.

In testimony whereof we hereunto affix our signatures in the presence of two witnesses.

WILLIAM J. BURROWS.
HORACE B. LAWRENCE.

Witnesses:
DANIEL W. LEWIS,
ETHEL F. MILLER.